(12) United States Patent
Ishioka et al.

(10) Patent No.: US 10,635,901 B2
(45) Date of Patent: Apr. 28, 2020

(54) HEAD-MOUNTED DISPLAY

(71) Applicant: Sony Interactive Entertainment Inc., Tokyo (JP)

(72) Inventors: Manabu Ishioka, Tokyo (JP); Shotaro Tada, Tokyo (JP); Toshihiro Kusunoki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/747,269

(22) PCT Filed: Aug. 4, 2016

(86) PCT No.: PCT/JP2016/072967
§ 371 (c)(1),
(2) Date: Jan. 24, 2018

(87) PCT Pub. No.: WO2017/026371
PCT Pub. Date: Feb. 16, 2017

(65) Prior Publication Data
US 2018/0218211 A1      Aug. 2, 2018

(30) Foreign Application Priority Data

Aug. 11, 2015   (JP) ................................. 2015-158976

(51) Int. Cl.
*G02B 27/01*        (2006.01)
*G02B 25/00*        (2006.01)
(Continued)

(52) U.S. Cl.
CPC ..... *G06K 9/00604* (2013.01); *G02B 27/0093* (2013.01); *H04N 5/2253* (2013.01); *H04N 5/33* (2013.01)

(58) Field of Classification Search
CPC .......... H04N 5/33; H04N 5/2253; H04N 5/64; G06K 9/00604; G02B 27/02
See application file for complete search history.

(56) References Cited

U.S. PATENT DOCUMENTS 6,529,331 B2 *   3/2003   Massof ................ G02B 27/017
                                                        345/9
6,634,749 B1    10/2003   Morrison
(Continued)

FOREIGN PATENT DOCUMENTS

CN        102928979 A      2/2013
CN        103809687 A      5/2014
(Continued)

OTHER PUBLICATIONS

International Preliminary Report and Written Opinion for corresponding PCT Application No. PCT/JP2016/072967, 11 pages, dated Feb. 22, 2018.

(Continued)

*Primary Examiner* — Philip P. Dang
(74) *Attorney, Agent, or Firm* — Matthew B. Dernier, Esq.

(57) ABSTRACT

Provided is a head-mounted display in which it is easy to photograph eyes of a user that wears the head-mounted display. The HMD that is worn by the user includes a display unit disposed in front of the eyes of the user, an optical system disposed between the display unit and eyes of the user, and an imaging unit disposed between the display unit and the optical system, the imaging unit imaging the display unit in which an image of the eyes of the user is reflected.

5 Claims, 3 Drawing Sheets

(51) Int. Cl.
*G06K 9/00* (2006.01)
*G02B 27/00* (2006.01)
*H04N 5/225* (2006.01)
*H04N 5/33* (2006.01)

(56) References Cited

U.S. PATENT DOCUMENTS

| | | | |
|---|---|---|---|
| 7,071,973 B1* | 7/2006 | Yoshioka | H04N 5/2253 348/219.1 |
| 7,432,917 B2* | 10/2008 | Wilson | G06F 3/0418 345/173 |
| 7,907,150 B2* | 3/2011 | Shulman | H04N 13/341 345/629 |
| 9,025,252 B2 | 5/2015 | Lewis | |
| 9,448,405 B2 | 9/2016 | Yamamoto | |
| 9,495,589 B2 | 11/2016 | Strombom | |
| 9,720,232 B2 | 8/2017 | Hua | |
| 10,369,314 B2 | 8/2019 | Chodkowski | |
| 2011/0043644 A1* | 2/2011 | Munger | G02B 27/017 348/207.1 |
| 2011/0242053 A1* | 10/2011 | Chiu | G06F 3/0421 345/175 |
| 2011/0279666 A1* | 11/2011 | Strombom | A61B 3/113 348/78 |
| 2012/0176474 A1* | 7/2012 | Border | G02B 27/2264 348/46 |
| 2013/0120224 A1* | 5/2013 | Cajigas | G09G 5/00 345/8 |
| 2014/0125579 A1 | 5/2014 | Yamamoto | |
| 2014/0285404 A1* | 9/2014 | Takano | G06F 3/005 345/8 |
| 2014/0361957 A1* | 12/2014 | Hua | G06F 3/013 345/8 |
| 2015/0055085 A1* | 2/2015 | Fonte | G06F 16/22 351/178 |
| 2015/0148665 A1* | 5/2015 | Sato | A61M 39/0208 600/424 |
| 2015/0198809 A1 | 7/2015 | Wei | |
| 2015/0238719 A1 | 8/2015 | Chodkowski | |
| 2016/0370591 A1 | 12/2016 | Wilson | |
| 2017/0140223 A1 | 5/2017 | Wilson | |

FOREIGN PATENT DOCUMENTS

| | | |
|---|---|---|
| CN | 104793337 A | 7/2015 |
| EP | 1131663 A1 | 9/2001 |
| JP | 089205 A | 1/1996 |
| JP | 09127459 A | 5/1997 |
| JP | 11202256 A | 7/1999 |
| JP | 2002301030 A | 10/2002 |
| JP | 2002328330 A | 11/2002 |
| JP | 2006053321 A | 2/2006 |
| JP | 2008241822 A | 10/2008 |
| JP | 2012515579 A | 7/2012 |
| JP | 2015508182 A | 3/2015 |
| JP | 2015530205 A | 10/2015 |
| JP | 5824697 B1 | 11/2015 |
| WO | 0026713 A1 | 5/2000 |
| WO | 2015198477 A1 | 12/2015 |
| WO | 2016103525 A1 | 6/2016 |

OTHER PUBLICATIONS

Notification of Reason for Refusal for corresponding Japanese Patent Application No. 2017-534399, 9 pages, dated Oct. 30, 2018.
International Search Report for corresponding PCT Application No. PCT/JP2016/072967, 4 pages, dated Oct. 25, 2016.
Extended European Search Report for corresponding EP Application No. 16835068, 9 pages, dated Mar. 7, 2019.
Rolf R Hainich et al: "Chapter 10.12: Adaptive Displays and Eye Tracking" In: "Displays : Fundamentals and Applications", CRC Press vol. 13, pp. 481-493 (Jan. 1, 2011).
Hong Hua et al: "Video-based eyetracking methods and algorithms in head-mounted displays", Optics Express, vol. 14. No. 10, p. 4328-4350, (Jan. 1, 2006).
Korean Intellectual Property Office Notice of Preliminary Rejection for corresponding KR Application No. 10-2018-7003038, 10 pages, dated Mar. 20, 2019.
Notification of Reason for Refusal for corresponding JP Application No. 2019-013837, 9 pages, dated Jul. 30, 2019.
CN First office action for corresponding CN Application No. 201680045546.6, 15 pages, dated Sep. 6, 2019.

* cited by examiner

HEAD-MOUNTED DISPLAY

TECHNICAL FIELD

The present invention relates to a head-mounted display.

BACKGROUND ART

In a head-mounted display or the like that is worn on a head of a user and in which a video or the like is viewed as disclosed in PTL 1 to 4, a technique has been known in which a position of eyes or line-of-sight direction of the user is detected from an image of the eyes of the user photographed by a camera.

CITATION LIST

Patent Literature

[PTL 1] JP 2015-508182T;
[PTL 2] JP 2002-301030A;
[PTL 3] JP 1997-127459A;
[PTL 4] JP 2012-515579T

SUMMARY

Technical Problem

When photographing eyes of a user that wears a head-mounted display, a camera is installed in a location (for example, an upper portion or lower portion of an optical system) that is a space between the eyes of the user and the optical system disposed between a display unit and the eyes of the user, and that has no obstruction in viewing the display unit by the user.

Herein, in the head-mounted display that is worn on a head, a distance between the optical system and the eyes of the user that wears the head-mounted display becomes small. Also, an actual state is that a size of the optical system is preferably larger in order to broaden a field of view of the user. Then, there occurs a problem that a photographing angle of the camera to the eyes of the user becomes shallow and it is difficult to photograph the eyes of the user with eyelids, eyelashes, or the like becoming an obstacle.

In view of the foregoing, it is an object of the present invention to provide the head-mounted display in which it is easy to photograph the eyes of the user that wears the head-mounted display.

Solution to Problem

In order to solve the above-described problem, a head-mounted display worn by a user according to the present invention, includes a display unit disposed in front of eyes of the user, an optical system disposed between the display unit and the eyes of the user, and an imaging unit disposed between the display unit and the optical system, the imaging unit imaging the display unit in which an image of the eyes of the user is reflected.

In a mode of the present invention, it may be assumed that the head-mounted display further includes a light-irradiation unit that irradiates light onto the eyes of the user, and the imaging unit images an image of the eyes of the user reflected in the display unit by reflecting the light irradiated by the light-irradiation unit by the eyes of the user.

In this mode, it may be assumed that the light-irradiation unit is disposed between the optical system and the eyes of the user and directly irradiates light onto the eyes of the user.

Further, it may be assumed that the light-irradiation unit is disposed between the display unit and the optical system and irradiates, onto the eyes of the user, reflected light in which light irradiated onto the display unit is reflected.

Further, it may be assumed that the light-irradiation unit irradiates infrared light, and the imaging unit is an infrared camera capable of imaging the infrared light.

Further, in a mode of the present invention, it may be assumed that the head-mounted display further includes a line-of-sight detection unit that detects a line-of-sight direction of the user on the basis of an image including the image of the eyes of the user imaged by the imaging unit.

DESCRIPTION OF EMBODIMENT

Hereinafter, an embodiment of the present invention will be described with reference to the accompanying drawings.

Figure 1:
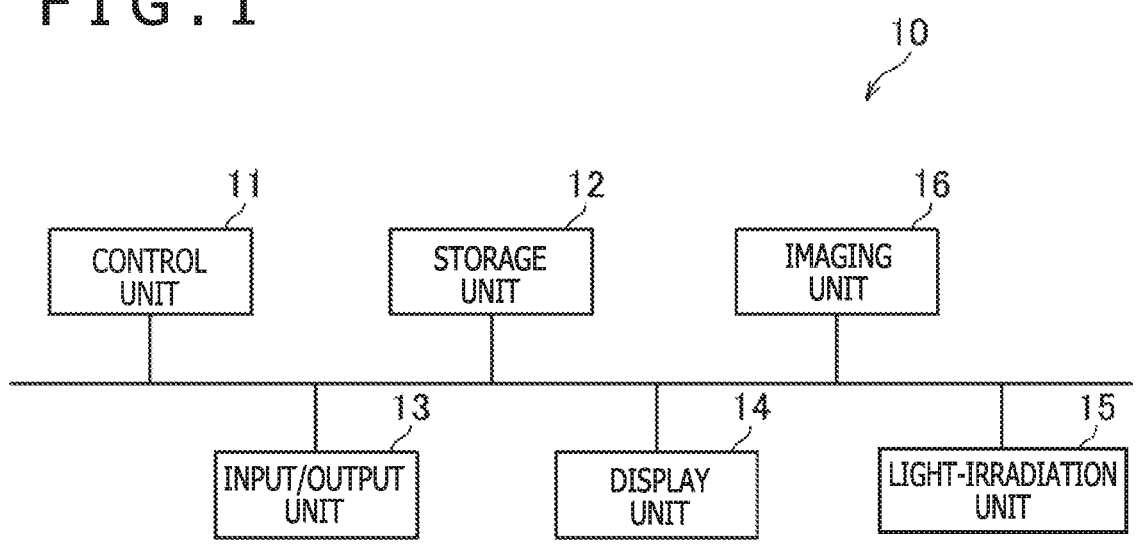
FIG. 1 is a diagram illustrating an example of a hardware configuration of a head-mounted display (HMD) according to an embodiment of the present invention.
Figure 2:
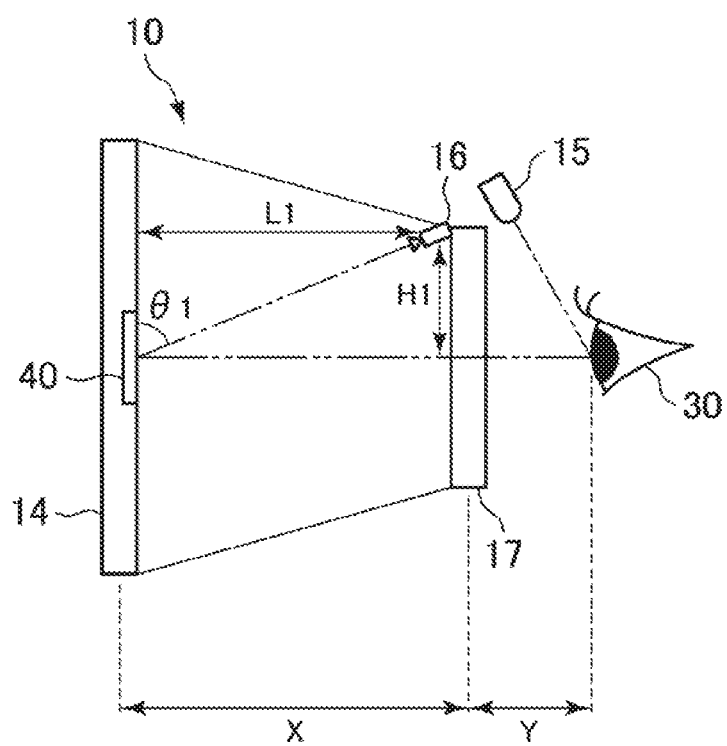
FIG. 2 is a schematic diagram illustrating a first example of a configuration of the HMD according to the present embodiment.

FIG. 1 is a diagram illustrating an example of a hardware configuration of an HMD 10 according to an embodiment of the present invention. FIG. 2 is a schematic diagram illustrating a first example of a configuration of the HMD 10 according to the present embodiment.

As illustrated in FIG. 1, the HMD 10 according to the present embodiment includes, for example, a control unit 11, a storage unit 12, an input/output unit 13, a display unit 14, a light-irradiation unit 15, and an imaging unit 16.

The control unit 11 includes a program control device such as a central processing unit (CPU), and executes various types of information processing in accordance with programs stored in the storage unit 12.

The storage unit 12 includes a memory device such as a random access memory (RAM) or read-only memory (ROM), and stores programs or the like executed by the control unit 11. Further, the storage unit 12 also functions as a work memory of the control unit 11.

The input/output unit 13 is an input/output interface such as a high-definition multimedia interface (HDMI) (registered trademark) port or a universal serial bus (USB) port, for example.

The display unit 14 is a display such as a liquid crystal display or an organic electroluminescence (EL) display, for example. The display unit 14 according to the present embodiment displays, for example, a video or the like expressed by video signals received from an entertainment apparatus such as a home game machine, digital versatile disc (DVD) player, or Blue-ray (registered trademark) player connected via the input/output unit 13. In addition, the display unit 14 according to the present embodiment may be capable of displaying a three-dimensional video.

The light-irradiation unit 15 is an optical device such as a light-emitting diode (LED). The light-irradiation unit 15 according to the present embodiment is assumed to irradiate light of a wavelength band other than a visible light band, called infrared light; however, the light-irradiation unit 15 is not limited to this example, and may be assumed to irradiate light of the visible light band.

The imaging unit 16 is a camera such as a digital camera for generating an image in which an object is imaged, for example. The imaging unit 16 according to the present embodiment is assumed to be an infrared camera capable of imaging infrared light; however, the imaging unit 16 is not limited to this example, and may be a camera capable of imaging visible light. Further, as illustrated in FIG. 2, the light-imaging unit 16 according to the present embodiment is disposed so as to image the display unit 14 and images the display unit 14 in which an image 40 of eyes of a user obtained by using infrared light reflected by eyes 30 of the user is reflected. In addition, the imaging unit 16 may be assumed to image the display unit 14 in which the image 40 of the eyes of the user obtained by using visible light reflected by the eyes 30 of the user is reflected.

The control unit 11 further detects a position of the eyes of the user or a line-of-sight direction of the user from an image including the image 40 of the eyes of the user imaged by the imaging unit 16. The control unit 11 is assumed to detect the position of the eyes of the user or the line-of-sight direction by using a known line-of-sight detection technique. For example, the control unit 11 detects the position of the eyes of the user or the line-of-sight direction of the user on the basis of a positional relationship between pupils of the user and a basic point obtained by reflecting infrared light by corneas of the user. Alternatively, on the basis of the position of irises or pupils, the control unit 11 may detect the position of the eyes of the user or the line-of-sight direction of the user. In addition, the imaging unit 16 may include a function of detecting the position of the eyes of the user or the line-of-sight direction of the user.

As described above, the position of the eyes of the user or the line-of-sight direction of the user detected from an image including the image 40 of the eyes of the user imaged by the imaging unit 16 is applicable to calibration of the HMD 10 or a line-of-sight tracking function of the user. The calibration of the HMD 10 is for adjusting a display position of a video in the display unit 14 at the time of starting up the HMD 10, at the time of starting up applications, or the like; for example, the display position of the video can be adjusted so that the video is displayed in the position of the eyes of the user on the display unit 14 by using the detected position of the eyes of the user. In the line-of-sight tracking function of the HMD 10, for example, a line-of-sight tracking can be performed by using the detected line-of-sight direction of the user.

In addition, the image including the image 40 of the eyes of the user imaged by the imaging unit 16 may be assumed to be transmitted to an external information processing apparatus via the input/output unit 13. In this case, the position of the eyes of the user or the line-of-sight direction of the user is assumed to be detected by using the image including the image 40 of the eyes of the user received by the external information processing apparatus.

In the first example of the configuration of the HMD 10 according to the present embodiment illustrated in FIG. 2, a state in which the user wears the HMD 10 is illustrated. As illustrated in FIG. 2, in the HMD 10 according to the present embodiment, the display unit 14 and an optical system 17 including at least one optical member such as a mirror, a lens, or a prism are disposed in front of the eyes of the user. That is, the optical system 17 is disposed in front of the eyes of the user and the display unit 14 is disposed at a front surface of the eyes 30 of the user through the optical system 17. Further, it is assumed that when a distance from the display unit 14 to the optical system 17 is X and a distance from the optical system 17 to the eyes 30 of the user is Y, the distance Y is shorter than the distance X. In particular, in the HMD 10 worn by the user, the distance Y tends to become short. In the above-described HMD 10 according to the present embodiment, video light output from the display unit 14 passes through the optical system 17 and is made incident on the eyes 30 of the user, and thereby the user can view a video displayed on the display unit 14. Further, the light-irradiation unit 15 is disposed between the optical system 17 and the eyes 30 of the user and irradiates infrared light onto the eyes 30 of the user. The imaging unit 16 is a camera capable of imaging infrared light and is disposed facing to the display unit 14 between the display unit 14 and the optical system 17. Herein, it is assumed that a vertical distance between the imaging unit 16 and a straight line incident vertically on the display unit 14 from the eyes 30 of the user is H1 and a vertical distance between the display unit 14 and the imaging unit 16 is L1.

In the HMD 10 according to the present embodiment illustrated in FIG. 2, the infrared light irradiated onto the eyes 30 of the user by the light-irradiation unit 15 is reflected by the eyes 30 of the user; further, the reflected light passes through the optical system 17 and is made incident on the display unit 14, and thereby the image 40 of the eyes of the user by the infrared light is reflected in the display unit 14. Then, the imaging unit 16 images the display unit 14 in which the image 40 of the eyes of the user by the infrared light is reflected. In addition, the image 40 of the eyes of the user by the infrared light may be only required to indicate the pupils of the user and the basic point obtained by reflecting the infrared light by the corneas of the user; further, the imaging unit 16 may be disposed so as to image a portion of the display unit 14 in which the above-described image 40 of the eyes of the user is reflected. As described above, in the HMD 10 according to the present embodiment illustrated in FIG. 2, a photographing angle of the imaging unit 16 to the image 40 of the eyes of the user reflected in the display unit 14 is θ1. It is to be noted that, in FIG. 2, the photographing angle 91 to a center of the image 40 of the eyes of the user reflected in the display unit 14 is illustrated as an example.

Figure 3:
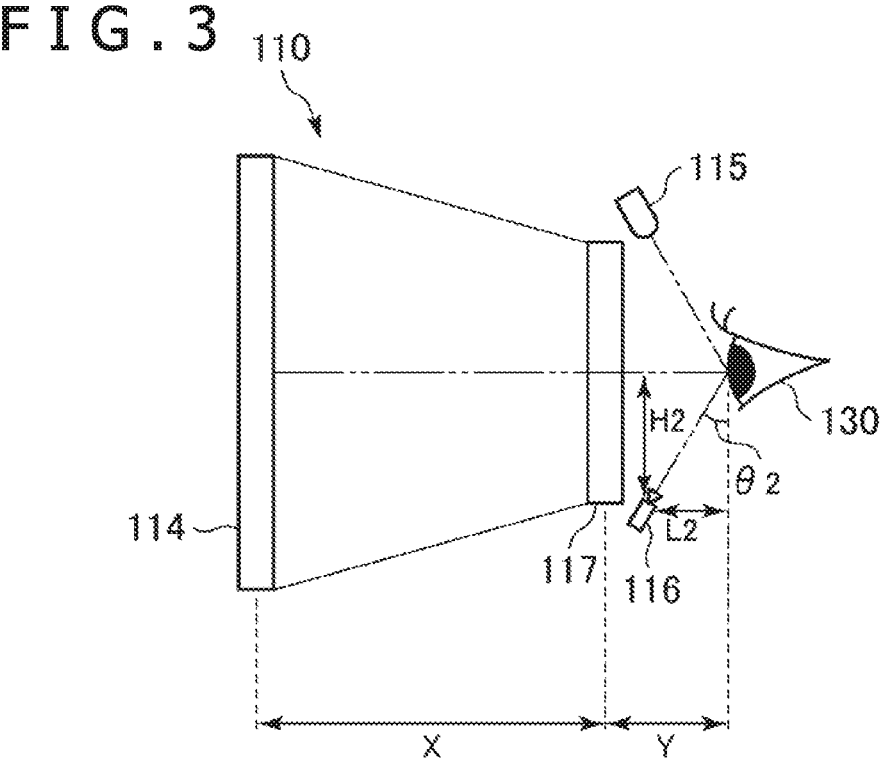
FIG. 3 is a schematic diagram illustrating a configuration of the HMD according to a contrast example.

Subsequently, a contrast example with the HMD 10 according to the present embodiment illustrated in FIG. 2 will be described. FIG. 3 is a schematic diagram illustrating a configuration of an HMD 110 according to the contrast example. In the HMD 110 according to the contrast example illustrated in FIG. 3, a display unit 114 and an optical system 117 including at least one optical member such as a mirror, a lens, or a prism are disposed in front of the eyes of the user. That is, the optical system 117 is disposed in front of the eyes of the user and the display unit 114 is disposed at the front surface of eyes 130 of the user through the optical system 117. Further, a light-irradiation unit 115 is disposed between the optical system 117 and the eyes 130 of the user and irradiates infrared light onto the eyes 130 of the user. An imaging unit 116 is a camera capable of imaging infrared light and is disposed facing to the eyes 130 of the user between the optical system 117 and the eyes 130 of the user. In addition, the display unit 114, the light-irradiation unit 115, the imaging unit 116, and the optical system 117 of the HMD 110 according to the contrast example illustrated in FIG. 3 are assumed to be the same as the display unit 14, the light-irradiation unit 15, the imaging unit 16, and the optical system 17 of the HMD 10 according to the present embodiment illustrated in FIG. 2, respectively. Thus, a distance X from the display unit 114 to the optical system 117 and a distance Y from the optical system 117 to the eyes 130 of the user are assumed to be the same as those of the HMD 10 according to the present embodiment illustrated in FIG. 2.

In the HMD 110 according to the contrast example illustrated in FIG. 3, the infrared light irradiated onto the eyes 130 of the user by the light-irradiation unit 115 is reflected by the eyes 130 of the user and the reflected light is made incident on the imaging unit 116. As described above, the imaging unit 116 of the HMD 110 according to the contrast example is capable of imaging the pupils of the user and the basic point obtained by reflecting the infrared light irradiated by the light-irradiation unit 115 by the corneas of the user. Further, in the HMD 110 according to the contrast example illustrated in FIG. 3, a photographing angle of the imaging unit 116 to the eyes 130 of the user is θ2. It is to be noted that, in FIG. 3, the photographing angle 82 to a center of the eyes 130 of the user is illustrated as an example.

Herein, the HMD 10 according to the present embodiment illustrated in FIG. 2 and the HMD 110 according to the contrast example illustrated in FIG. 3 are compared with each other.

First, in the HMD 10 according to the present embodiment, the imaging unit 16 is preferably disposed in a location in which it is easy to image the image 40 of the eyes of the user reflected in the display unit 14 and a video displayed on the display unit 14 by the user is not prevented from being viewed. In the HMD 10 according to the present embodiment as illustrated in FIG. 2, for example, the imaging unit 16 is disposed at the end of the optical system 17 that is a position near to the optical system 17. That is, the vertical distance L1 between the display unit 14 and imaging unit 16 in the HMD 10 according to the present embodiment is a value approximate to the distance X. Further, the vertical distance H1 between the imaging unit 16 and a straight line incident on the display unit 14 vertically from the eyes 30 of the user is a value according to a size of the optical system 17 and the position of the eyes of the user and is, for example, approximately half of a height of the optical system 17.

Subsequently, in the HMD 110 according to the contrast example, the imaging unit 116 is preferably disposed in a location in which it is easy to image the eyes 130 of the user and a video displayed on the display unit 114 is not prevented from being viewed by the user. In the HMD 110 according to the contrast example as illustrated in FIG. 3, for example, the imaging unit 116 is disposed at the end of the optical system 117 that is a position near to the optical system 117. That is, a vertical distance L2 between the eyes 30 of the user and the imaging unit 116 in the HMD 110 according to the contrast example is a value approximate to the distance Y. Further, a vertical distance H2 between the imaging unit 116 and a straight line incident on the display unit 114 vertically from the eyes 130 of the user is a value according to a size of the optical system 117 and the position of the eyes of the user and is, for example, approximately half of a height of the optical system 117. It is to be noted that, in the HMD 110 according to the contrast example illustrated in FIG. 3, as the distance Y is shorter and as the size of the optical system 117 is larger, the photographing angle 82 of the imaging unit 116 to the eyes 130 of the user is shallower and eyelashes, eyelids, or the like of the user become an obstacle to the imaging.

As described above, in FIGS. 2 and 3, the vertical distance H1 in the HMD 10 according to the present embodiment is approximately the same as the vertical distance H2 in the HMD 110 according to the contrast example. Further, the vertical distance L1 in the HMD 10 according to the present embodiment is longer than the vertical distance L2 in the HMD 110 according to the contrast example. Therefore, the photographing angle θ1 of the imaging unit 16 to the image 40 of the eyes of the user reflected in the display unit 14 according to the present embodiment is larger than the photographing angle 82 of the imaging unit 116 to the eyes 130 of the user according to the contrast example. As described above, the imaging unit 16 according to the present embodiment images the display unit 14 in which the image 40 of the eyes of the user is reflected, and thereby it is possible to deepen the photographing angle of the imaging unit 16 to the image 40 of the eyes of the user and it is easy to photograph the image 40 of the eyes of the user.

In the above-described example, an example is provided in which the vertical distance H1 in the HMD 10 according to the present embodiment is approximately the same as the vertical distance H2 in the HMD 110 according to the contrast example, and the vertical distance L1 in the HMD 10 according to the present embodiment is longer than the vertical distance L2 in the HMD 110 according to the contrast example; however, the present embodiment is not limited to this example. For example, the vertical distance H1 in the HMD 10 according to the present embodiment may be larger than half of the height of the optical system 17. Further, the vertical distance L1 in the HMD 10 according to the present embodiment may be shorter than the distance X or may be shorter than the distance Y. Even in this case, the imaging unit 16 according to the present embodiment images the display unit 14 in which the image 40 of the eyes of the user is reflected, and thereby there is not present an obstacle to the imaging such as the eyelashes or eyelids of the user as in the HMD 110 according to the contrast example, and therefore it is easy to image the image 40 of the eyes of the user.

The imaging unit 16 further images the display unit 14 in which the image 40 of the eyes of the user by the infrared light is reflected, and thereby the image 40 of the eyes of the user can be imaged even during the period in which videos or the like received from entertainment apparatus are displayed on the display unit 14. That is, the infrared light is irradiated onto the eyes of the user, and thereby the image 40 of the eyes of the user can be reflected in the display unit 14 without obstructing the video displayed on the display unit 14. Through this processing, even while the user views the video or the like received from the entertainment apparatus, the control unit 11 is capable of detecting the position of the eyes of the user or the line-of-sight direction of the user and performing the calibration or the line-of-sight tracking. For example, a line-of-sight input operation can be used as a user input operation to be accepted while the video or the like received from the entertainment apparatus is displayed on the display unit 14; further, the entertainment apparatus is capable of performing processing relating to the input operation according to the position of the eyes of the user or the line-of-sight direction of the user.

Further, in the HMD 10 according to the present embodiment illustrated in FIG. 2, the imaging unit 16 may be assumed to be a camera capable of imaging visible light. In this case, the imaging unit 16 is assumed to perform image processing such as filtering processing to an image obtained by imaging the display unit 14 and thereby extract the image 40 of the eyes of the user by the infrared light.

Further, in the HMD 10 according to the present embodiment illustrated in FIG. 2, it may be assumed that the imaging unit 16 is a camera capable of imaging visible light and further the light-irradiation unit 15 is not disposed. Even when the light-irradiation unit 15 is not disposed, reflected light obtained by reflecting visible light by the eyes 30 of the user passes through the optical system 17 and is made incident on the display unit 14, and thereby the image 40 of the eyes of the user by the visible light is reflected in the display unit 14. Then, the imaging unit 16 may be assumed to image the display unit 14 in which the image 40 of the eyes of the user by the visible light is reflected. Herein, when the imaging unit 16 images the display unit 14 in which the image 40 of the eyes of the user by the visible light is reflected, the imaging unit 16 preferably images the display unit 14 during the period in which the video or the like received from the entertainment apparatus is not displayed on the display unit 14.

Figure 4:
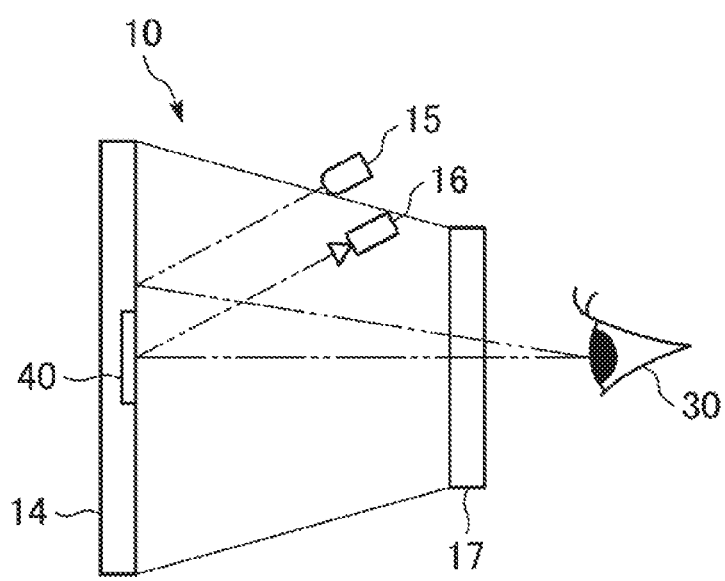
FIG. 4 is a schematic diagram illustrating a second example of a configuration of the HMD according to the present embodiment.

FIG. 4 is a schematic diagram illustrating a second example of a configuration of the HMD 10 according to the present embodiment. The HMD 10 according to the present embodiment illustrated in FIG. 4 is obtained by making different a position of the light-irradiation unit 15 of the HMD 10 according to the present embodiment illustrated in FIG. 2. The light-irradiation unit 15 of the HMD 10 according to the present embodiment illustrated in FIG. 4 is disposed between the display unit 14 and the optical system 17 and irradiates the infrared light called infrared laser onto the display unit 14. The other configurations are similarly to those of the HMD 10 according to the present embodiment illustrated in FIG. 2, and therefore redundant descriptions are omitted herein.

In the HMD 10 according to the present embodiment illustrated in FIG. 4, the infrared light irradiated onto the display unit 14 by the light-irradiation unit 15 is reflected by the display unit 14; further, the reflected light passes through the optical system 17 and is irradiated onto the eyes 30 of the user. Then, the infrared light irradiated onto the eyes 30 of the user is reflected by the eyes 30 of the user; further, the reflected light passes through the optical system 17 again and is made incident on the display unit 14, and thereby the image 40 of the eyes of the user by the infrared light is reflected in the display unit 14. Then, the imaging unit 16 images the display unit 14 in which the image 40 of the eyes of the user is reflected. As described above, the reflected light obtained by reflecting the infrared light irradiated onto the display unit 14 is irradiated onto the eyes 30 of the user and thereby the infrared light is made incident on the eyes 30 of the user from the front side. Thus, since the image 40 of the eyes of the user is easily reflected in the display unit 14, the imaging unit 16 easily images the display unit 14 in which the image 40 of the eyes of the user is reflected. Thus, an accuracy of detection in the position of the eyes of the user or in the line-of-sight direction of the user through the control unit 11 is improved.

In addition, the configuration of the HMD 10 illustrated in FIGS. 2 and 4 is consistently one example and is not limited to this example. In the above-described example, in FIGS. 2 and 4, an example is provided in which the light-irradiation unit 15 and the imaging unit 16 are disposed on the upper side of the HMD 10; further, for example, the light-irradiation unit 15 and the imaging unit 16 may be disposed on the lower side of the HMD 10 or may be disposed on the side surface side of the HMD 10. These dispositions may be appropriately set in accordance with characteristics of the display unit 14 or the optical system 17, the distance X from the display unit 14 to the optical system 17, the distance X2 from the optical system 17 to the eyes 30 of the user, or the like.

Modification Example

Figure 5:
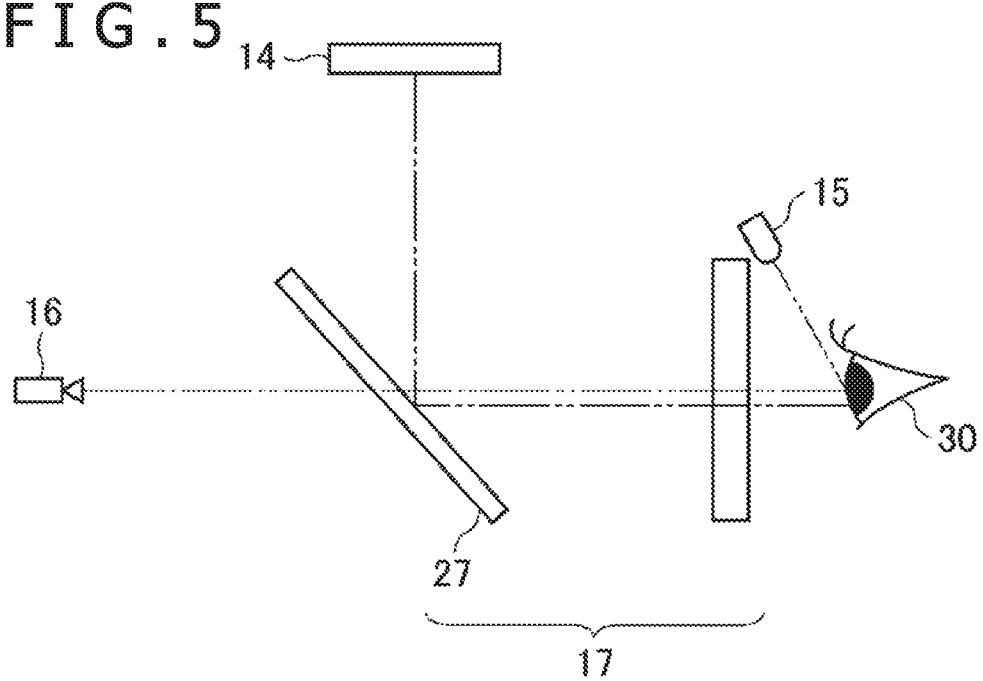
FIG. 5 is a schematic diagram illustrating a first modification example of a configuration of the HMD according to the present embodiment.

FIG. 5 is a schematic diagram illustrating a first modification example of the configuration of the HMD 10 according to the present embodiment. FIG. 5 illustrates a state in which the user wears the HMD 10. In the HMD 10 according to the modification example illustrated in FIG. 5, the optical system 17 is disposed in front of the eyes of the user and the imaging unit 16 is disposed at the front surface of the eyes 30 of the user through the optical system 17. The optical system 17 includes a mirror 27 that reflects visible light and transmits infrared light and is disposed between the imaging unit 16 and the eyes 30 of the user. The display unit 14 is disposed so that video light output from the display unit 14 is reflected by the mirror 27 and is made incident on the eyes 30 of the user. The light-irradiation unit 15 is disposed between the optical system 17 and the eyes 30 of the user and irradiates the infrared light onto the eyes 30 of the user. The imaging unit 16 is assumed to be an infrared camera capable of imaging the infrared light.

In the HMD 10 according to the modification example illustrated in FIG. 5, the infrared light irradiated onto the eyes 30 of the user by the light-irradiation unit 15 is reflected by the eyes 30 of the user, and the reflected light is transmitted through the mirror 27 and is made incident on the imaging unit 16. This processing permits the imaging unit 16 to image the eyes 30 of the user to the eyes 30 of the user from the front side.

Figure 6:
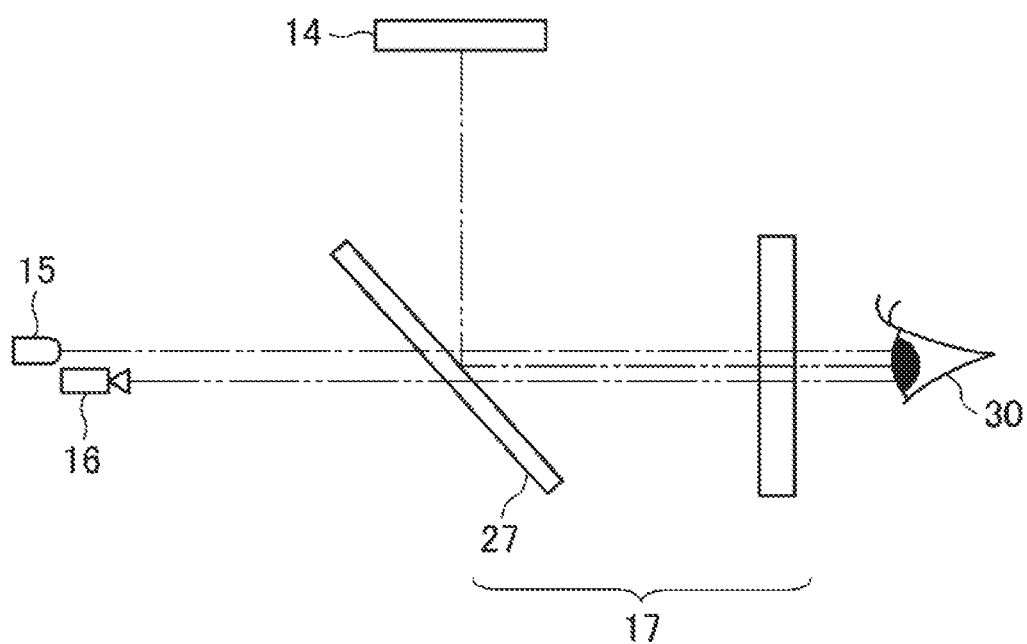
FIG. 6 is a schematic diagram illustrating a second modification example of a configuration of the HMD according to the present embodiment.

FIG. 6 is a schematic diagram illustrating a second modification example of the configuration of the HMD 10 according to the present embodiment. The HMD 10 according to the modification example illustrated in FIG. 6 is obtained by making different the position of the light-irradiation unit 15 of the HMD 10 according to the modification example illustrated in FIG. 5. The light-irradiation unit 15 of the HMD 10 according to the modification example illustrated in FIG. 6 is disposed in front of the eyes of the user through the optical system 17. The other configurations are similarly to those of the HMD 10 according to the modification example illustrated in FIG. 5, and therefore redundant descriptions are omitted herein.

In the HMD 10 according to the modification example illustrated in FIG. 6, the infrared light irradiated by the light-irradiation unit 15 is transmitted through the mirror 27 and is irradiated onto the eyes 30 of the user. Then, the infrared light irradiated onto the eyes 30 of the user is reflected by the eyes 30 of the user; further, the reflected light is transmitted through the mirror 27 and is made incident on the imaging unit 16. This processing permits the light-irradiation unit 15 to irradiate the infrared light onto the eyes 30 of the user from the front side, and permits the imaging unit 16 to image the eyes 30 of the user to the eyes 30 of the user from the front side.

The invention claimed is:
1. A head-mounted display worn by a user, comprising:
a display unit disposed in front of eyes of the user;

an optical system disposed between the display unit and the eyes of the user;

an imaging unit disposed between the display unit and the optical system, the imaging unit imaging the display unit in which an image of the eyes of the user is reflected; and a light-irradiation unit that irradiates light onto the eyes of the user, wherein the light-irradiation unit is disposed between the display unit and the optical system and irradiates, onto the eyes of the user, reflected light in which light irradiated onto the display unit is reflected.

2. The head-mounted display according to claim 1, further comprising:

wherein the imaging unit images an image of the eyes of the user reflected in the display unit by reflecting the light irradiated by the light-irradiation unit by the eyes of the user.

3. The head-mounted display according to claim 2, wherein the light-irradiation unit is disposed between the optical system and the eyes of the user and directly irradiates light onto the eyes of the user.

4. The head-mounted display according to claim 2, wherein the light-irradiation unit irradiates infrared light, and the imaging unit is an infrared camera capable of imaging the infrared light.

5. The head-mounted display according to claim 1, further comprising: a line-of-sight detection unit that detects a line-of-sight direction of the user on a basis of an image including the image of the eyes of the user imaged by the imaging unit.

\* \* \* \* \*